June 10, 1958 F. N. WILLIAMS 2,838,070
VALVE ASSEMBLY FOR FAUCETS
Filed Feb. 2, 1956
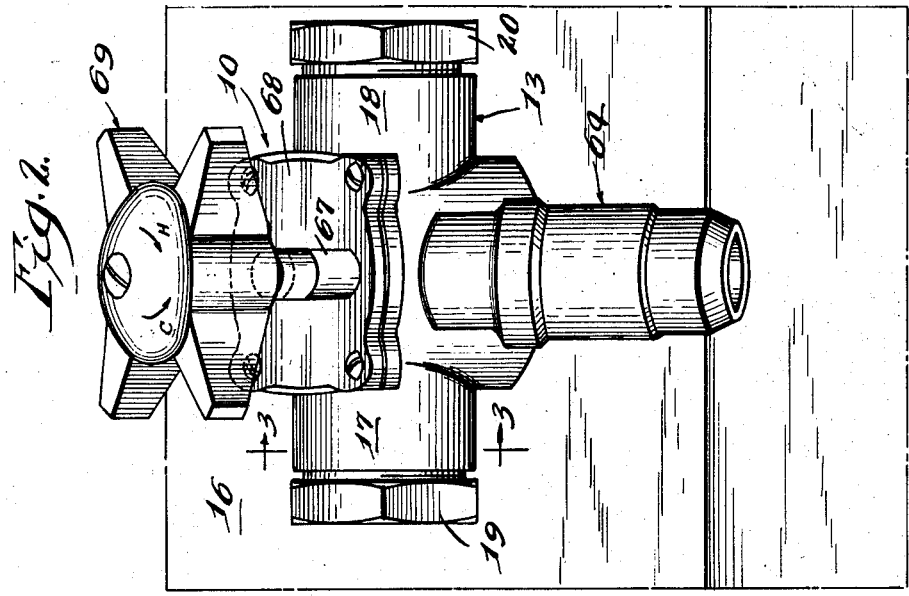
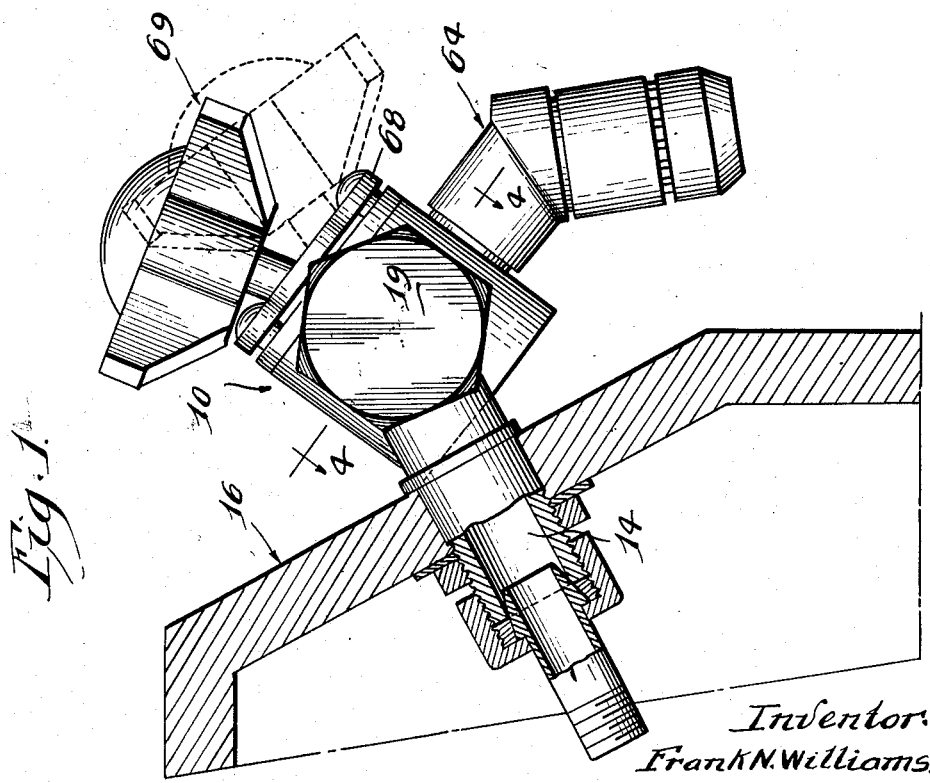
Inventor:
Frank N. Williams
By. Wilson & Geppert
Attorneys.

June 10, 1958 F. N. WILLIAMS 2,838,070
VALVE ASSEMBLY FOR FAUCETS
Filed Feb. 2, 1956 3 Sheets-Sheet 2
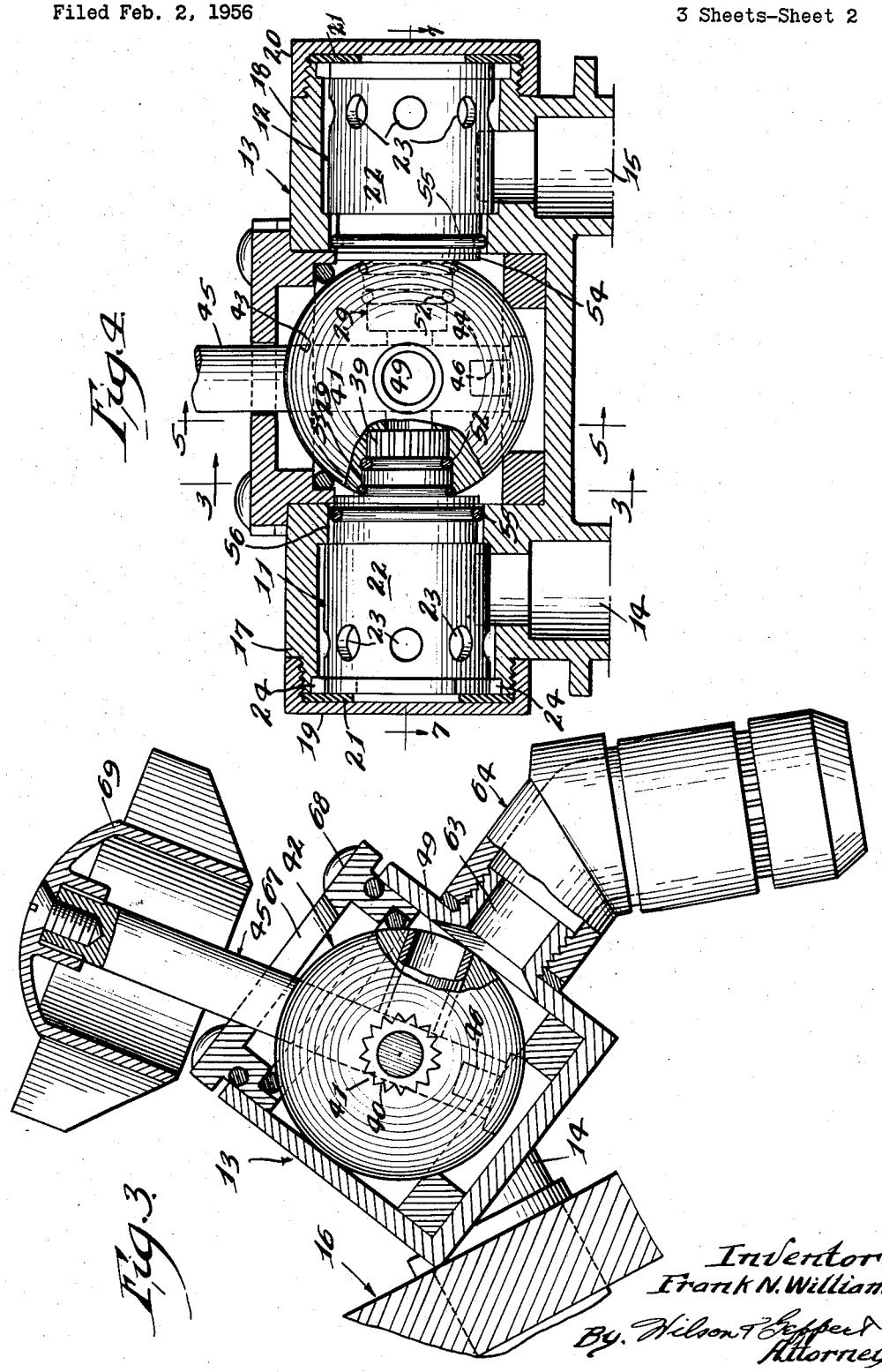
Inventor.
Frank N. Williams,
By. Wilson & Geppert
Attorneys.

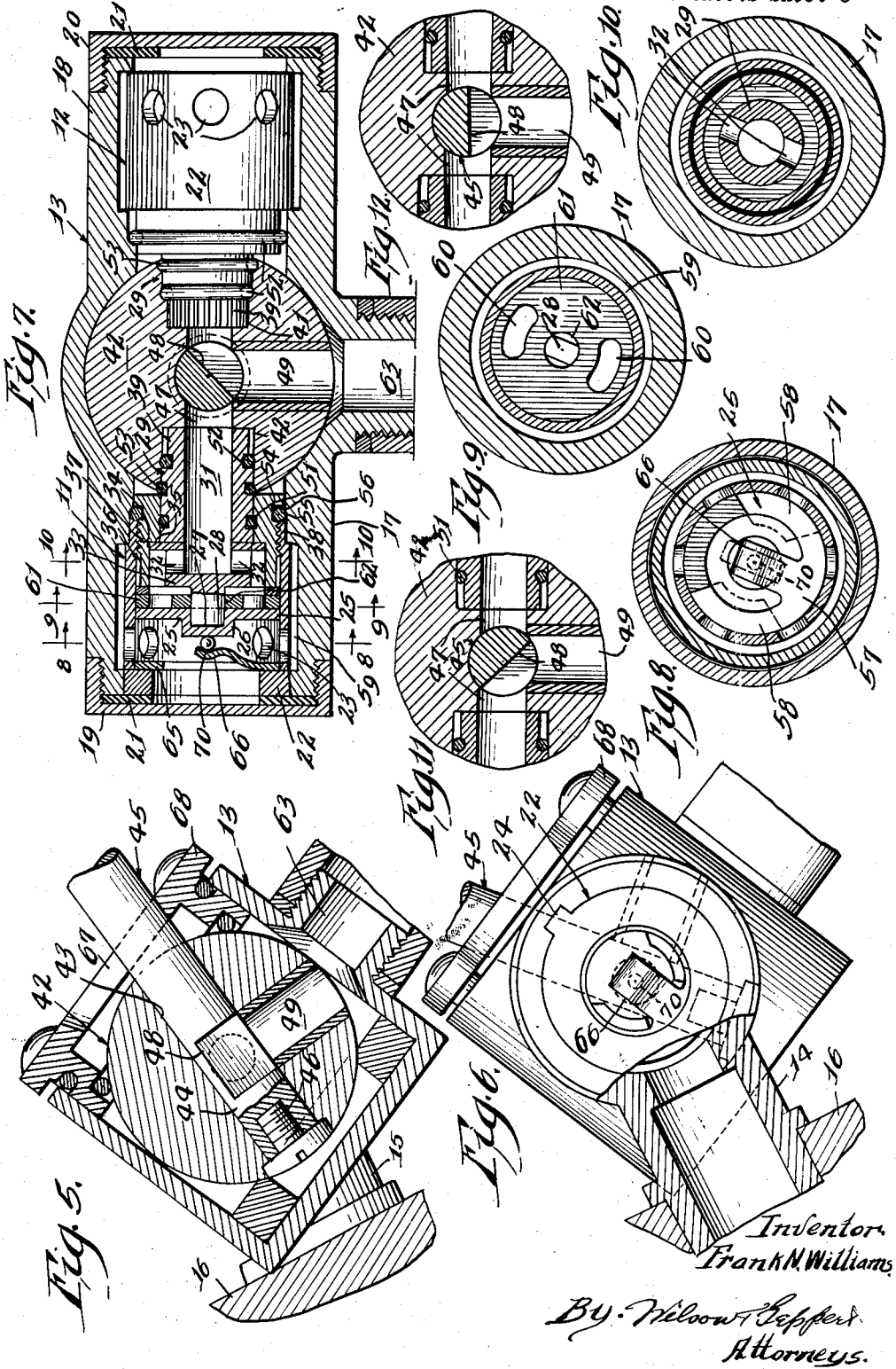

United States Patent Office

2,838,070
Patented June 10, 1958

2,838,070

VALVE ASSEMBLY FOR FAUCETS

Frank N. Williams, Wadsworth, Ill., assignor to Federal-Huber Company, Chicago, Ill., a corporation of Illinois Application February 2, 1956, Serial No. 563,010

12 Claims. (Cl. 137—636.3)

The present invention relates to a faucet and more particularly to a novel valve assembly or unit for faucets and especially mixing faucets suitable for use in lavatories, bath tubs, sinks, etc.

One of the objects of the present invention is to provide a novel self-contained and pre-assembled valve unit that has an exceptionally long life and eliminates annoying faucet leaks so prevalent with valves employing washers of rubber, fiber or plastic composition that require frequent replacement. Not only do such washers or seals have a relatively short life due to wear incident to their use, but they frequently crack, become loose or for some other reason leak or fail to effectively seal water under pressure. Also the valve seat may become scored, worn or damaged by repeated operation of the worn or damaged washer, with such wear and leakage resulting in substantial expense for repairs or replacement. In addition, such leakage if extended over a substantial period of time may cause damage to the wash basin, sink, etc., as well as waste an appreciable quantity of water.

Although the cost of replacing a washer when accomplished by the home owner may be nominal, frequently one may not have the necessary tools or one inexperienced in such matters may damage or mar the fittings sufficiently to necessitate new parts that may be relatively expensive. Others will call a plumber and although he may replace the worn part in a relatively short time, the charge involved to compensate him for the time spent travelling to and from the home in addition to making the necessary replacement or repairs, is substantial and may frequently be more than the cost of a new faucet. But in addition to being expensive, such calls often lead to criticism of the plumber and the manufacturer of the faucet.

The present invention obviates the above difficulties and comprehends a novel valve unit in which the component parts are pre-assembled and retained in operative position and the pre-assembled unit bodily inserted into operative position and bodily removed should the occasion require its removal or replacement. The relatively rotatable valve elements controlling the flow of water or fluid therethrough are of rigid metal or material having smooth or polished contacting surfaces disposed and maintained in intimate contact at all times.

Another important object of the present invention is the provision of a novel mixing faucet having a pair of the novel valve units so constructed, arranged and mounted in the faucet body or housing that the passage of the entering hot or cold water is directed longitudinally through a hollow valve stem, and the valve elements are operated or actuated in a novel manner to positively control the entering hot and cold water and their mixing in any desired proportions.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a view in side or end elevation showing one embodiment of a mixing faucet embodying the novel valve construction and assembly, the handle and operating shaft being shown in full lines in "off" position and in dotted outline in the fully open or "on" position.

Fig. 2 is a view in front elevation thereof.

Fig. 3 is a view, part in vertical cross section and part in side elevation, the section being taken substantially on the line 3—3 of Figs. 2 and 4 and viewed in the direction of the arrows.

Fig. 4 is a longitudinal cross sectional view through the faucet body taken substantially on the line 4—4 of Fig. 1 and viewed in the direction of the arrows, the valve units and ball being shown in elevation except for a portion of the ball being broken away to show the manner of connecting the valve units to the ball.

Fig. 5 is a fragmentary view, part in vertical cross section and part in side elevation, the view being taken substantially on the line 5—5 of Fig. 4 and viewed in the direction of the arrows, but with the operating shaft moved to its elevated or "off" position for stopping flow through the faucet.

Fig. 6 is a broken or fragmentary view in side or end elevation of the faucet assembly but with the end cap removed to disclose the positioning of one of the assembled valve units.

Fig. 7 is a longitudinal cross sectional view taken substantially on the line 7—7 of Fig. 4 and viewed in the direction of the arrows, but showing one of the valve units in side elevation.

Fig. 8 is a view in vertical cross section taken substantially in a plane represented by the line 8—8 of Fig. 7 and viewed in the direction of the arrows.

Fig. 9 is a view in vertical cross section taken substantially on the line 9—9 of Fig. 7 and viewed in the direction of the arrows.

Fig. 10 is a view in vertical cross section taken substantially on the line 10—10 of Fig. 7 and viewed in the direction of the arrows.

Fig. 11 is a fragmentary view in vertical cross section of the rotatable ball of Fig. 7 but showing the operating shaft rotated to the full "hot" position, whereas Fig. 7 shows the shaft rotated to the full "cold" position.

Fig. 12 is a view similar to Fig. 11 but showing the operating shaft rotated to its neutral or intermediate position.

Referring more particularly to the disclosure in the drawings wherein there is shown one embodiment of a mixing faucet 10 containing a pair of the novel valve units 11 and 12 of the present invention (Figs. 4 and 7), one controlling the entry and passage of hot water and the other the entry or passage of cold water entering the hollow body 13 of the faucet through a hot water inlet 14 and a cold water inlet 15 (Figs. 1, 3 and 4) in a mounting or support 16. These valve units 11 and 12 are self-contained and interchangeable assemblies of similar construction which in the illustrative embodiment of the faucet 10 are adapted to be bodily inserted into and removed from the open ends 17 and 18 of the elongated hollow body 13 and when installed are enclosed by threaded end caps 19 and 20 and a gasket 21, with these valve units being adapted to be readily inserted into operative position, removed and replaced, when required.

Each unit 11 and 12 comprises a cylindrical valve body 22 (Figs. 4 and 7) having multiple, spaced openings or ports 23 adjacent its outer end for passage therethrough into the valve body 22 of the water or fluid entering through the inlets 14 and 15, and at the outer end provided with diametrically opposed lugs 24 (Fig. 6) adapted to be received in similarly spaced slots or notches in the ends of the faucet body 13 for positive and accurate alignment therewith. In the hollow valve body 22 and spaced inwardly from its outer end is a rotatable valve member or closure 25 of suitable metal having an embossment 26 provided with an elongated slot 27 conformably receiving a substantially rectangular projection 28 on the outer end of a valve stem 29. This valve stem is hollow or longitudinally cored (Fig. 7) to provide a passage 31 therethrough connecting with transverse ports 32 disposed between the base 33 of the valve stem 29 and a collar or annular enlargement 34 thereon, the latter adapted to seat against an annular reduction or shoulder 35 in an encompassing sleeve 36 that is externally threaded at 37 for connection to the internally threaded portion 38 on the inner end of the valve body 22.

The inner end of the valve stem 29 is externally splined at 39 (Figs. 3, 4 and 7) to be received in complementary internal splines 40 provided in a recess 41 in one side of a spherical member or ball 42. This ball or spherical part 42 is diametrically cored to provide a passage 43 for receiving an end 44 of an operating shaft 45 with the inner end 44 of this shaft internally threaded to receive a screw or bolt 46 for locking the shaft in the ball 42. The ball or spherical member 42 is also diametrically cored to provide a passage 47 therethrough intersecting and opening into the passage 43, the passage 47 being aligned with the recesses 41 and their diametrically arranged splines 40, with each set of said splines adapted to receive the externally splined end 39 of a valve stem 29. As shown in Figs. 5, 7, 11 and 12, the shaft 45 is cut away at 48 in the ball 42 in alignment with the passages 47 for controlling the flow of water through the interior of each valve unit 11 and 12 to a common port or discharge 49 in the ball 42.

The valve stem 29 (Figs. 4 and 7) is externally grooved to receive spaced O-rings 51 and 52, with the O-ring 51 effecting sealing contact with the reduced diameter in the encompassing sleeve 36 and the O-ring 52 effecting sealing contact with the encompassing wall of a recess 41 in the ball or spherical part 42 and adjacent the splines 40 receiving the splined end 39 of the valve stem 29. An expansible metal ring 53 is adapted to be anchored in a groove intermediate the grooves for the O-rings 51 and 52 to lock the valve stem 29 assembled in its encompassing sleeve 36.

The encompassing sleeve 36 at its inner end is provided with an external end flange 54 and between this end flange and the external threads 37 on the sleeve 36 is provided an O-ring 55 for sealing contact with the inner end of the valve body 22 and the encompassing cylindrical surface on the stepped reduction 56 in the faucet body 13.

The rotatable valve member 25 (Fig. 8) is cut away to provide spaced sectors 57 with the water or fluid dispensed entering the spaces or cut-outs 58 between these sectors from the ports 23 in the valve body 22 which is spaced at 59 from the interior of the encompassing faucet body 13 and passing through ports 60 in a stationary valve seat or member 61. This valve seat or stationary member 61 is provided with a centrally arranged opening 62 through which extends the projecting end 28 of the valve stem 29. Thus the water or fluid to be dispensed passes through the ports 60 into the encompassing space between the interior of the sleeve 36 and the outer end of the valve stem 29, through the transverse ports 32 in the stem and into longitudinal passage 31 of the stem 29. From there, the fluid enters the radial passage or port 49 in the interior of the ball 42 opening into an outlet port 63 of a discharge nozzle or spout 64 (Figs. 3, 4, 5, 7, 11 and 12).

To maintain the rotatable, metal valve member 25 in intimate surface contact with the metal valve seat 61 there is provided a resilient metal washer 65 having a centrally arranged spring finger 66 dished to receive and retain a metal spherical member or ball bearing 70 (Figs. 7 and 8) maintained against the base of the embossment 26 on the valve member 25 for spring-biasing this valve member against the valve seat 61.

The operating shaft 45 projects outwardly through an elongated slot 67 in a cover plate 68 on the faucet body 13 (Figs. 1 to 6, inclusive), and at its outer end is provided with a control handle 69 for moving the shaft longitudinally of the slot 67 whereby to control flow through the faucet 10. When the shaft is in its upper or raised position (Figs. 1, 2, 3 and 6), the flow is stopped, and when the shaft is moved to its lowered position (Fig. 5) full flow through the faucet is effected. Movement to any intermediate position controls the flow between the fully closed or "off" and fully open or "on" positions of the faucet. This is accomplished by merely moving the shaft 45 in the slot 67 and thereby rotating the ball or spherical member 42 about an axis longitudinally of the valve units 11 and 12 and the faucet body 13. As the ball 42 is connected to the valve stem 29 of each valve unit 11 and 12 through the interengaging splines 39 and 40, the valve members 25 are simultaneously rotated to fully open, partially open or closed position in accordance with the movement of the shaft 45 in the elongated slot 67 by means of the handle 69.

As the disclosed embodiment is a mixing faucet in which hot or cold water or any desired mixture thereof is to be dispensed, the shaft 45 and its handle 69 are capable of being rotated in the ball 42 from the central or neutral position of Figs. 2 and 12 in which hot and cold water are equally dispensed, in a clockwise direction to the position shown in Fig. 11 where only hot water is dispensed, or in a counterclockwise direction to the position shown in Fig. 7 where only cold water is dispensed. Rotating the shaft 45 by movement of the handle 69 to any intermediate position from that shown in Figs. 7, 11 and 12, adjusts the quantity or flow of hot and cold water, as desired.

Thus by moving the handle 69 and its shaft 45 longitudinally of the slot 67 and downwardly from its elevated, closed position (Figs. 1, 2, 3 and 6) to its lower open position (Fig. 5), the ball 42 is rotated and through its splined connection with the hollow valve stems 29 of each of the valve units 11 and 12, rotates the valve members 25 from their closed position in which the cut-outs 58 are moved out of alignment with the ports 60 in the valve seat or stationary member 61, to their open position in which the cut-outs 58 and the ports 60 are in alignment or registry for maximum flow from the hot and cold water inlets 14 and 15, respectively. If the handle 69 and its shaft 45 are in their neutral or central position as in Fig. 12, the cut-away portion of the shaft is so located as to permit equal flow of hot and cold water through the spout or nozzle 64.

Rotating or moving the handle 69 and its shaft 45 in a clockwise direction, adjusts and increases the flow of hot water into the spout or nozzle 64 until the handle is rotated or moved to the limit of its clockwise turning when only hot water is discharged as in Fig. 11. Moving the handle and its shaft in a counter-clockwise direction likewise adjusts and increases the flow of cold water until the handle reaches the limit of its counter-clockwise turning when only cold water is dispensed as in Fig. 7.

From the above description and the disclosure in the drawings, it will be apparent that the present invention relates to a novel valve assembly for faucets and more particularly to a pre-assembled valve unit for mixing faucets provided with a single handle, lever or shaft (1) movable in a single or vertical plane to control the volume of flow, and (2) rotatable in a clockwise or counterclockwise direction from its neutral or centered position to control the temperature of the discharged water.

Having thus disclosed the invention, I claim:

1. In a mixing faucet having a housing provided with a hot water inlet and a cold water inlet, a pre-assembled valve unit for each inlet for controlling its flow and bodily insertable into and removable from the housing, each valve unit including a cylindrical valve body anchored in a bore in the housing and spaced from the encompassing wall of said housing, said valve body having one or more inlet ports about its circumference open to the flow from one of said inlets, a rigid, metal valve member rotatably mounted in said body adjacent said ports and provided with a flat sealing surface having ports for the passage therethrough of water entering the valve body through the ports in said body, a valve seat in the form of a flat metal plate mounted in fixed position in the valve body and in intimate contact with the rotatable valve member with said valve seat ports therethrough adapted to be aligned with the ports in said valve member as the latter is moved to open position, a hollow valve stem rotatably mounted in said valve body and having at one end a projection and openings for the passage of water into the hollow valve stem when the valve member is rotated to open position in which its ports are moved into registry with the ports of the valve seat, means for connecting the projection on said valve stem to said valve member for rotating the latter, and means for rotating said valve stem and valve member to control the flow of water through said faucet.

2. In a mixing faucet having a housing provided with a hot water inlet, a cold water inlet and a discharge spout, a pre-assembled valve unit for each inlet for controlling its flow and with each valve unit bodily insertable into and removable from the housing, each valve unit including a valve body anchored in a bore in the housing and spaced from the encompassing wall of said housing, said valve body having one or more inlet ports about its circumference open to the flow from one of said inlets, a rigid valve member rotatably mounted in said body adjacent said ports and provided with a flat sealing surface having one or more ports for the passage therethrough of water entering the valve body through the ports in said valve body, a stationary valve seat mounted in the valve body in intimate contact with the rotatable valve member and provided with one or more ports therethrough, a hollow valve stem rotatably mounted in said valve body and having openings for the passage of water through said valve member and valve seat into and through the hollow valve stem when the valve member is rotated to open position with its ports in registry with the ports of the valve seat, means for connecting the valve member to said valve stem for rotating said valve member upon rotation of the valve stem, a shaft in the housing for rotating the valve stem and valve member of each valve unit for controlling the flow of water from said inlets through said valve units and faucet housing to be dispensed through said spout, and a handle for operating said shaft.

3. In a faucet having a housing provided with an inlet and an outlet, a pre-assembled valve unit adapted to be bodily inserted and removed from the housing of the faucet, comprising a cylindrical valve body mounted in spaced relation with the interior of the faucet housing and provided with spaced openings for the passage of water into the valve body from the faucet inlet, a valve member rotatably mounted in the valve body, a valve seat mounted in fixed position in said valve body and in abutting relation with the valve member, said valve member and valve seat each having one or more ports which when brought into registry communicating with said openings for the passage of water therethrough, a sleeve mounted in the valve body, a hollow valve stem rotatably mounted in the sleeve and valve body, said valve stem being connected at one end to said rotatable valve member and having a longitudinal passage and one or more ports communicating with the ports in the valve member and valve seat and opening into said longitudinal passage in the stem, and manually operable control means connected to the other end of the valve stem for rotating the latter and its valve member and thereby controlling the flow of water from said faucet inlet, through the openings of the valve body, through the registering ports in the valve member and valve seat, and through the ports and passage in the valve stem to the outlet of the faucet.

4. In a faucet having a housing provided with an inlet and an outlet, a pre-assembled valve unit adapted to be bodily inserted and removed from the housing of the faucet, comprising a cylindrical valve body mounted in spaced relation with the interior of the faucet housing and provided with spaced openings for the passage of water into the valve body from the faucet inlet, a valve member rotatably mounted in the valve body, a valve seat mounted in fixed position in said valve body and in abutting relation with the valve member, said valve member and valve seat being of rigid metal, means for spring-biasing the valve member and maintaining it in intimate surface contact with the valve seat, one or more ports in said valve member and valve seat movable into and out of communication with the openings in the valve body for the passage of water therethrough, a sleeve mounted in the valve body, a hollow valve stem rotatably mounted in the sleeve and valve body, said valve stem being connected at one end to said rotatable valve member and having a longitudinal passage and one or more ports communicating with the ports in the valve member and valve seat and opening into said longitudinal passage in the stem, and manually operable control means connected to the other end of the valve stem for rotating the latter and its valve member and thereby controlling the flow of water from said faucet inlet, through the openings of the valve body, through the registering ports in the valve member and valve seat, and through the ports and passage in the valve stem to the outlet of the faucet.

5. In a faucet having a housing provided with an inlet and an outlet, a pre-assembled valve unit adapted to be bodily inserted and removed from the housing of the faucet, comprising a cylindrical valve body mounted in spaced relation with the interior of the faucet housing and provided with spaced openings adjacent one end for the passage of water into the valve body from the faucet inlet, a valve member rotatably mounted in the valve body for controlling flow through said openings, a valve seat mounted in fixed position in said valve body and in abutting relation with the valve member, said valve member and valve seat having flat metal surfaces maintained in contact and each provided with one or more ports which control the passage of water therethrough, a sleeve threaded into the valve body for anchoring the valve member and valve seat in the valve body, a hollow valve stem rotatably mounted in the sleeve and valve body, said valve stem being connected to and carrying said rotatable valve member and having a longitudinal passage and one or more communicating ports, manually operable means connected to the valve stem for rotating the latter and its valve member for controlling the flow of water from said faucet inlet, through the openings in the valve body, through the communicating ports in the valve member and valve seat, and through the ports and passage in the valve stem to the outlet of the faucet, and spring-biasing means for maintaining the rotatable valve member in intimate surface contact with the valve seat.

6. In a mixing faucet having a faucet body provided with a hot water inlet, a cold water inlet and a discharge spout, a pre-assembled valve unit for controlling the flow through each inlet and bodily insertable into and removable from a bore in the interior of the faucet body, each valve unit comprising a cylindrical valve body anchored in fixed position in a bore in the faucet body and circumferentially spaced from the encompassing wall of the faucet body, inlet ports in the cylindrical wall of the valve body for the passage of water from the inlet into the valve body, a rotatable valve member and a fixed valve seat in the valve body adjacent said inlet ports with the valve member and seat having flat contacting surfaces each provided with one or more ports movable into and out of registry upon rotation of the valve member, a sleeve mounted in the valve body, a hollow valve stem provided with a longitudinal passage communicating with the discharge spout and transverse ports communicating with the ports in the valve member and the valve seat and the longitudinal passage for controlling the flow from the inlet to the discharge spout, means connecting the valve stem to said valve member, and manually-operated control means for rotating said valve stem and valve member for opening and closing passage through the valve member and valve stem.

7. In a mixing faucet having a faucet body provided with a hot water inlet, a cold water inlet and a discharge spout, a pre-assembled valve unit for each inlet for controlling the flow therefrom and bodily insertable into and removable from a bore in the interior of the faucet body, each valve unit comprising a cylindrical valve body anchored in fixed position in a bore in the faucet body and circumferentially spaced from the encompassing wall of the faucet body, inlet ports in the cylindrical wall of the valve body for the passage of water from an inlet into the valve body, a rotatable valve member and a fixed valve seat in the valve body adjacent said inlet ports with the valve member and seat having metal contacting surfaces each provided with one or more ports movable into and out of registry upon rotation of the valve member, means for retaining said valve member and valve seat in operative position in the valve body, a hollow valve stem provided with a longitudinal passage communicating with the discharge spout and ports communicating with the ports in the valve member and the valve seat for controlling flow into the longitudinal passage, a socket in the faucet body, a ball rotatably mounted in the socket and provided with diametrically arranged passages each communicating with the longitudinal passage of one of said valve stems, a radial passage in the ball communicating with the diametrically arranged passages and with the discharge spout, a shaft for rotating said ball about the axis of said valve stems and simultaneously rotating the valve stems for controlling the volume of flow from said inlets, and means on said shaft for controlling the volume of the hot and cold water entering the discharge spout and thereby controlling the temperature of the water being discharged.

8. In a mixing faucet having a faucet body provided with a hot water inlet, a cold water inlet and a discharge spout, a valve unit for each inlet for controlling the flow therefrom, each valve unit comprising a cylindrical valve body anchored in fixed position in a bore in the faucet body and circumferentially spaced from the encompassing wall of the faucet body, inlet ports in the valve body for the passage of water from an inlet into the valve body, a rotatable valve member and a fixed valve seat in the valve body adjacent said inlet ports with the valve member and seat having metal contacting surfaces each provided with one or more ports movable into and out of registry upon rotation of the valve member, means for retaining said valve member and valve seat in operative position in the valve body, a hollow valve stem provided with a longitudinal passage communicating with the discharge spout and ports communicating with the ports in the valve member and the valve seat for controlling flow into the longitudinal passage, a ball rotatably mounted in the faucet body and provided with passages communicating with the longitudinal passages of said valve stems and with the discharge spout, a shaft for rotating said ball about the axis of said valve stems and simultaneously rotating the valve stems for controlling the volume of flow from said inlets, and means on said shaft for controlling the volume of the hot and cold water entering the discharge spout and thereby controlling the temperature of the water being discharged.

9. In a mixing faucet having a housing provided with a hot water inlet, a cold water inlet and a discharge spout, a pre-assembled valve unit for each inlet for controlling its flow and with each valve unit bodily insertable into and removable from a bore in the housing adjacent an inlet, each valve unit including a valve body having one or more ports for the passage therethrough of water from its inlet, a valve member rotatably mounted in said body adjacent said ports and provided with a flat sealing surface having one or more ports for the passage therethrough of water entering the valve body through the ports in said valve body, a stationary valve seat mounted in the valve body in intimate contact with the rotatable valve member and provided with one or more ports therethrough, a hollow valve stem rotatably mounted in said valve body and having openings for the passage of water through said valve member and valve seat into and through the hollow valve stem when the valve member is rotated to open position with its ports in registry with the ports of the valve seat, means for connecting the valve member to said valve stem for rotating said valve member upon rotation of the valve stem, a shaft in the housing for rotating the valve stem and valve member of each valve unit for controlling the flow of water from said inlets through said valve units and faucet housing to be dispensed through said spout, a handle for operating said shaft, and means on said shaft for controlling the flow from the hot and cold water inlets to adjust the temperature of the water issuing from the spout.

10. In a mixing faucet having a faucet body provided with a hot water inlet, a cold water inlet and a discharge spout, a valve unit for each inlet for controlling the flow therefrom, each valve unit comprising a valve body anchored in fixed position in a bore in the faucet body and spaced from the encompassing wall of the faucet body, inlet ports in the valve body for the passage of water from an inlet into the valve body, a rotatable valve member and a fixed valve seat in the valve body adjacent said inlet ports with the valve member and seat having metal contacting surfaces each provided with one or more ports movable into and out of registry upon rotation of the valve member, means for retaining said valve member and valve seat in operative position in the valve body, a hollow valve stem provided with a longitudinal passage communicating with the discharge spout and ports communicating with the ports in the valve member and the valve seat for controlling flow into the longitudinal passage, means for connecting each valve stem to its valve member, and means for simultaneously rotating the valve stems and their valve members for opening and closing the valve members to control the volume of flow from each inlet to its hollow valve stem, said means for simultaneously rotating said valve stems and valve members including a rotatable shaft having an adjustable passage for controlling the volume of hot and cold water to be dispensed from the valve stems and the temperature of the water discharged from the spout.

11. In a faucet having a housing provided with an inlet and an outlet, a pre-assembled valve unit adapted to be bodily inserted and removed from the housing of the faucet, comprising a cylindrical valve body mounted in spaced relation with the interior of the faucet housing and provided with spaced openings for the passage of water into the valve body from the faucet inlet, a valve member rotatably mounted in the valve body, a valve seat mounted in fixed position in said valve body and in abutting relation with the valve member, said valve member and valve seat being of rigid metal, a spring-loaded ball engaging and spring-biasing the valve member and maintaining it in intimate surface contact with the valve seat, one or more passages through said valve member and valve seat adapted to be moved into and out of registry for the flow of water therethrough, a hollow valve stem rotatably mounted in the valve body with said valve stem connected at one end to said rotatable valve member and provided with a longitudinal passage, and manually operable control means connected to the other end of the valve stem for rotating the latter and its valve member and thereby controlling the flow of water from said faucet inlet, through the openings of the valve body, through the registering passages in the valve member and valve seat and through the longitudinal passage in the valve stem to the outlet of the faucet.

12. In a faucet having a housing provided with an inlet and an outlet, a pre-assembled valve unit adapted to be bodily inserted and removed from the housing of the faucet, comprising a cylindrical valve body mounted in spaced relation with the interior of the faucet housing and provided with spaced openings for the passage of water into the valve body from the faucet inlet, a valve member rotatably mounted in the valve body, a valve seat mounted in fixed position in said valve body and in abutting relation with the valve member, said valve member and valve seat being of rigid metal, with the valve member maintained in wiping contact with said valve seat, said valve member and seat provided with passages for the flow of water therethrough when the valve member is moved relative to the valve seat, a hollow valve stem rotatably mounted in the valve body and connected to said valve member for rotating the latter to move said passages into and out of registry, said hollow valve stem communicating with said passages and the outlet of the faucet for the flow therethrough of water, and means for controlling the rotation of said valve stem.

References Cited in the file of this patent

UNITED STATES PATENTS

| | | |
|---|---|---|
| 130,876 | Stevens | Aug. 27, 1872 |
| 513,475 | Bergman | Jan. 30, 1894 |
| 1,408,120 | Mirk | Feb. 28, 1922 |